United States Patent
Walters

(10) Patent No.: US 12,130,868 B2
(45) Date of Patent: Oct. 29, 2024

(54) INTERACTIVE FICTION PLATFORM AND METHOD

(71) Applicant: Heather Rose Walters, Salem, OR (US)

(72) Inventor: Heather Rose Walters, Salem, OR (US)

( * ) Notice: Subject to any disclaimer, the term of this patent is extended or adjusted under 35 U.S.C. 154(b) by 267 days.

(21) Appl. No.: 17/848,721

(22) Filed: Jun. 24, 2022

(65) Prior Publication Data

US 2023/0014899 A1 Jan. 19, 2023

Related U.S. Application Data

(60) Provisional application No. 63/216,723, filed on Jun. 30, 2021.

(51) Int. Cl.
*G06F 16/93* (2019.01)
*G06F 3/04842* (2022.01)
(Continued)

(52) U.S. Cl.
CPC .......... *G06F 16/93* (2019.01); *G06F 3/04842* (2013.01); *G06F 16/951* (2019.01); *G06F 40/166* (2020.01)

(58) Field of Classification Search
CPC .... G06F 16/93; G06F 3/04842; G06F 16/951; G06F 40/166; G06F 3/0482; G06Q 10/101; G06Q 30/06; G06Q 50/10
(Continued)

(56) References Cited

U.S. PATENT DOCUMENTS

| 6,859,211 | B2 * | 2/2005 | Friedlander | ........... G06F 40/166 434/156 |
| 7,574,649 | B1 * | 8/2009 | Safars | .................. G06F 16/957 715/277 |

(Continued)

OTHER PUBLICATIONS

Twine, https://twinery.org, downloaded Oct. 5, 2022, 5 pages.
(Continued)

*Primary Examiner* — Sheree N Brown
(74) *Attorney, Agent, or Firm* — Miller Nash LLP

(57) ABSTRACT

A platform to provide content to reader users and to gather content from writer users. The platform provides user interfaces to reader users displaying one or more titles accessible by the reader user, receives a user content input through the user interface identifying selection of a title, presents a first content block from the title to the reader user one or more buttons to indicate alternative storylines in the titles, and repeats until a final content block is accessed: receiving a button selection from the reader user through the user interface; and loading a next content block indicated by the button selection. The platform provides a title user interface to a writer user for a new title, receives title information for the new title, presents a writing user interface to the writer user, and repeats, until the receiving an input from the writer user indicating completion: receiving one or more user inputs containing a content block from the writer user through the user interface and text labels for one or more buttons associated with the content block; and generating tracking lines linking the content block to the buttons. The platform then associates the content blocks, buttons and tracking lines with the title and stores them in a database when the writer user indicates completion.

8 Claims, 12 Drawing Sheets

(51) Int. Cl.
*G06F 16/951* (2019.01)
*G06F 40/166* (2020.01)

(58) Field of Classification Search
USPC .......................................................... 707/705
See application file for complete search history.

(56) References Cited

U.S. PATENT DOCUMENTS

| | | | | |
|---|---|---|---|---|
| 7,631,013 | B2 * | 12/2009 | Parsons | G06F 16/93 |
| 8,424,916 | B2 * | 4/2013 | Shade | G09B 17/00 |
| | | | | 283/68 |
| 10,990,753 | B2 * | 4/2021 | Murdock | G06F 40/30 |
| 2002/0093541 | A1 * | 7/2002 | Schileru-Key | G06Q 30/0601 |
| | | | | 705/26.1 |
| 2005/0202386 | A1 * | 9/2005 | Clements | G09B 5/062 |
| | | | | 434/317 |
| 2012/0171653 | A1 * | 7/2012 | Kwon | G09B 5/062 |
| | | | | 715/255 |
| 2012/0236201 | A1 * | 9/2012 | Larsen | G06Q 30/02 |
| | | | | 348/468 |
| 2012/0266058 | A1 * | 10/2012 | Miller, Jr. | G06F 40/166 |
| | | | | 715/205 |
| 2012/0272159 | A1 * | 10/2012 | Seth | G06Q 10/10 |
| | | | | 715/751 |
| 2013/0061154 | A1 * | 3/2013 | Bennett | G06F 40/186 |
| | | | | 715/753 |
| 2013/0117665 | A1 * | 5/2013 | Tagliaferri | G06F 40/174 |
| | | | | 715/255 |
| 2013/0124980 | A1 * | 5/2013 | Hudson | G06T 11/60 |
| | | | | 715/779 |
| 2013/0132228 | A1 * | 5/2013 | Chang | G06Q 30/02 |
| | | | | 705/26.5 |
| 2014/0351679 | A1 * | 11/2014 | Tobita | G06F 40/174 |
| | | | | 715/202 |
| 2015/0040006 | A1 * | 2/2015 | Gentile | G06F 40/166 |
| | | | | 715/708 |
| 2017/0339089 | A1 * | 11/2017 | Longdale | G06F 40/134 |

OTHER PUBLICATIONS

ChoiceScript, https://www.choice-of-games.com/choicescript-intro/, downloaded Oct. 5, 2022, 8 pages.
Inklewriter, https://www.inklestudios.com/inklewriter/, downloaded Oct. 5, 2022, 6 pages.
ArticyDraft, https://www.articy.com/en/, downloaded Oct. 5, 2022, 7 pages.
Episode, https://www.episodeinteractive.com, downloaded Oct. 5, 2022, 5 pages.
Tales Creator, https://talescreator.com, downloaded Oct. 5, 2022, 8 pages.

* cited by examiner

FIG. 5

INTERACTIVE FICTION PLATFORM AND METHOD

CROSS REFERENCE TO RELATED APPLICATION

This application claims priority to and the benefit of U.S. Provisional Application No. 63/216,723, filed Jun. 30, 2021, which is incorporated herein by reference in its entirety.

TECHNICAL FIELD

This disclosure relates to interactive fiction, more particularly to a platform to allow writers to provide interactive fiction content.

BACKGROUND

Developers of game content typically use a tool such as Articy Draft. However, Articy Draft® and tools similar to it are not ideal for writing text-heavy interactive fiction. Developers typically end up writing the stories in a shared platform such as Google® Docs, or Microsoft Word®, and then transferring them to Articy Draft® or similar platform. This involves a laborious and ultimately expensive process.

Many writers outside of gaming do not think of "games" when they write interaction fiction. They typically just want to write a book or story with branching storylines. Every tool currently on the market focuses on games, not books. The tools have the underlying assumption that the writers want to make a game, with the art, programming, and all the extras that slow writers down.

For writers for whom words matter and who want the ability to create branching storylines in a word process, the tools available are simply too much. For readers who want to experience a new type of book, and want a centralized, standardized way to play through interactive fiction, the options on the market generally feel too cartoonish, too gamey, and too scattered. They may work as games but not as books or stories.

BRIEF DESCRIPTION OF THE DRAWINGS

FIG. 5 shows an embodiment of a user interface presented to a writer to set up a new story.

FIG. 7 shows an embodiment of a user interface presented to a writer having branches.

FIG. 8 shows an embodiment of a user interface presented to a writer having branches in a zoom out mode.

DETAILED DESCRIPTION OF THE EMBODIMENTS

The embodiments disclosed here provide a system and method to provide user access to a system that provides content, for sale or sharing, to users in either a reader or a writer role. The system allows readers to purchase content and then interact with it, and allows writers to provide content in a manner that assists the writers in managing the branches and storylines.

The below discussion employs various terms. The term "user" applies to any user of the system, regardless of their role. The term "reader" or "reader user" means a user that has purchased or will purchase content to read. The term "read" as used here means that the user will experience the content by reading the story and selecting various branches in the storyline. The discussion here may also refer to reading as "playing." The term "branch" means one of an alternative storyline, and "branching point" means the point where the user selects from alternative storylines. The term "writer" or "writer user" means a user who composes content for other users to be included in the library of titles for sale.

For the writer user, a small icon represents the branching points so the writer user can track the various branches. This will be discussed in more detail below. The term "title" or "titles" will mean the same as "game" or "games" and "story" or "stories" when the user is a reader. The reader may purchase or otherwise access content from the system for immediate viewing and/or participation, and the discussion may refer to that content as titles.

Other terms that the discussion will use various terms that have specific meetings. The term "button" means a live region of the user interface screen, familiar to most computer users. The term "content block" means the window, depicted in the figures further in the discussion, in which the writer users type their content. The term "story element" means either a content block or a button.

Figure 1:
FIGS. 1-3 show embodiments of set up and login pages of an interactive fiction platform.
Figure 2:
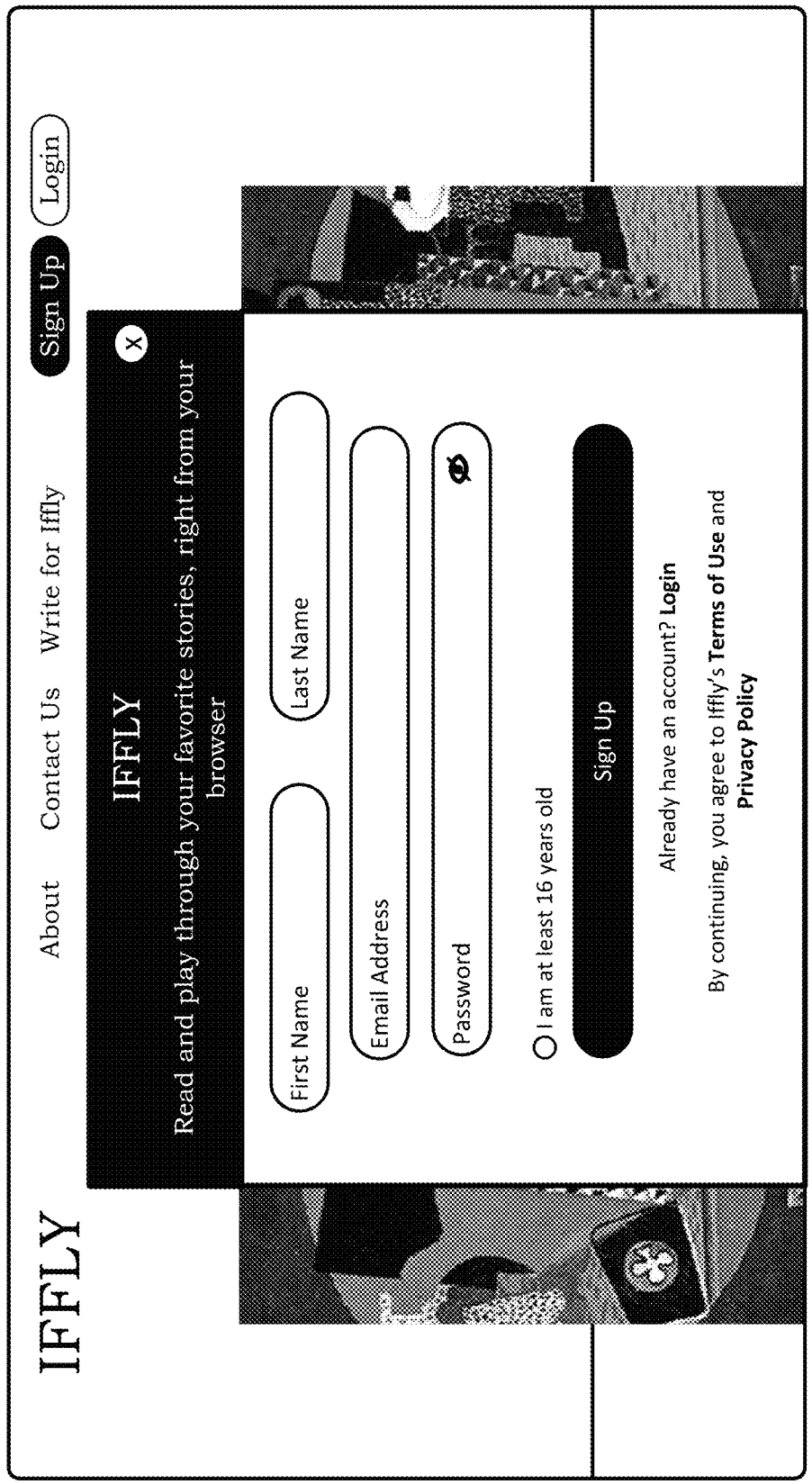
Figure 3:
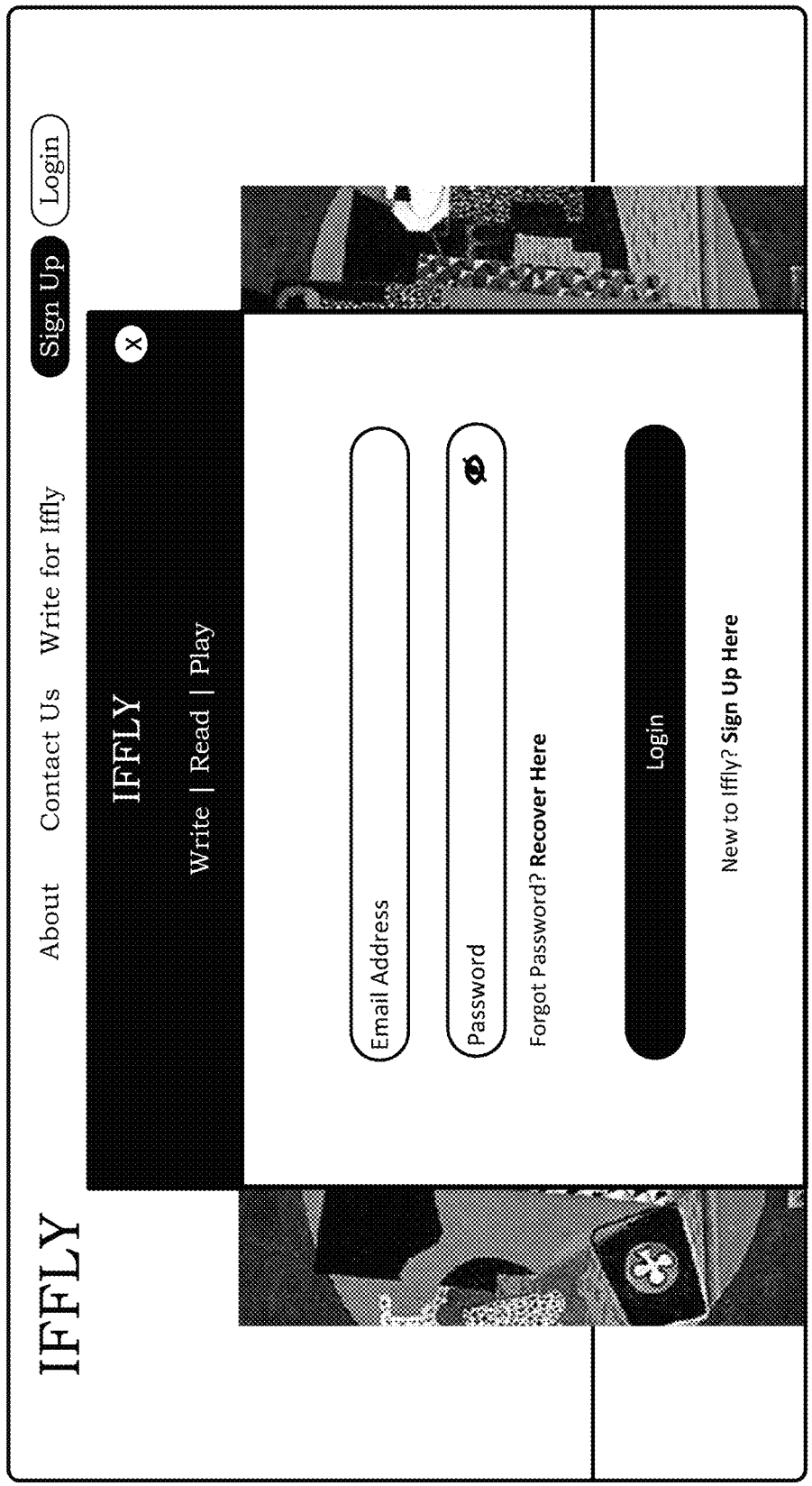

The users begin their interactions with the system once they have accessed the site, shown in FIG. 1, by registering as a user as shown in FIG. 2. The registration process creates a profile for the user, which will become the point in the system at which the user saves their titles, either those they are reading or those they are writing. After setting up their account, the user signs in on a screen similar to that shown in FIG. 3. Once the user signs in, the home page becomes the home page of the site without the login buttons.

Figure 4:
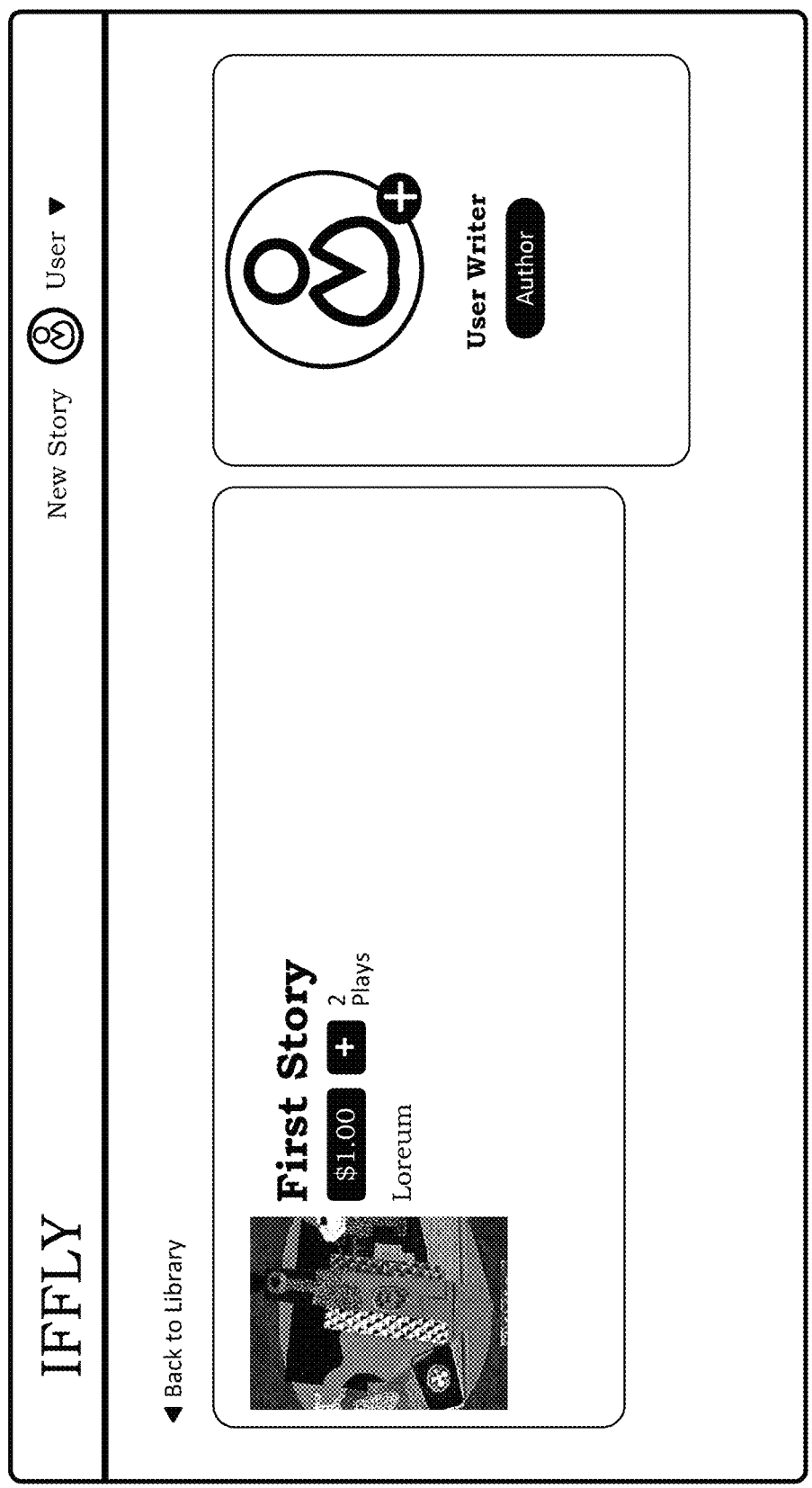
FIG. 4 shows an embodiment of a user interface of an interaction fiction platform presented to a user.

The home page will have a collection of titles for the user to browse, from which the user can select one to read. The system has a payment mechanism that allows the user to pay for those titles that require payment as shown in FIG. 4. Once purchased, these titles are added to the user's profile. If the user finds a title in which they are interested, but do not want to pay for and read then, the system can save the title to the user's profile as a title to "play later." The user would click on the "+" sign, which then changes to a line. The line indicates the story has been added to the user's "play later" to purchase and read/play later.

Figure 5:
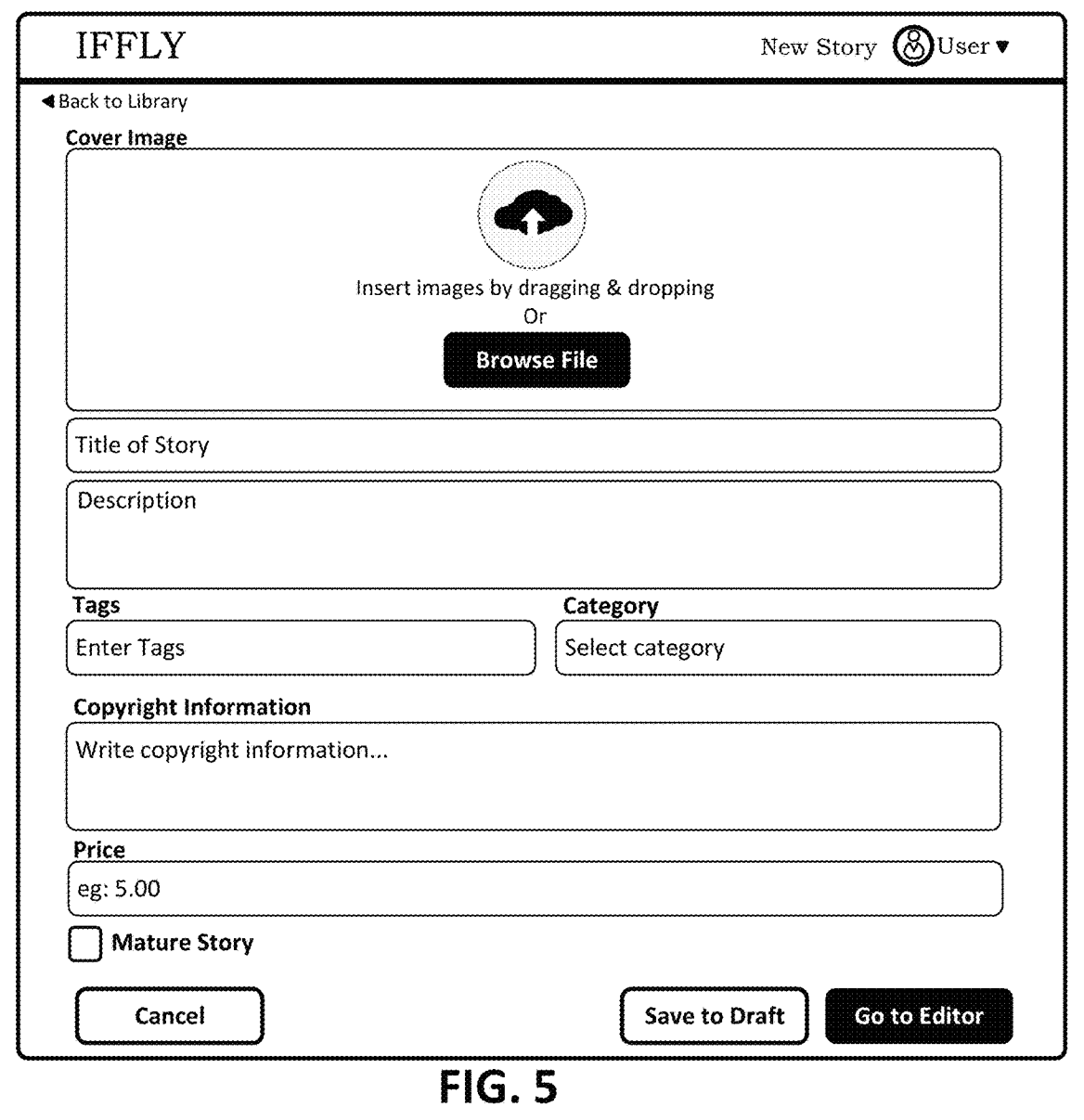

For ease of understanding, the discussion will assume that the user purchased the title to access the content as a writer. FIG. 5 shows an example of a user interface presented to a writer. The user selects their title and then selects "Go to Editor." The writer user could develop an entirely new story or could write an alternative to existing works. The limits of what the writer users can write are essentially the same as any other creative writing field. As long as they are complying with copyright law, they can write original works or works based on other books, or anything in between. Copyright dictates that writers cannot use books or stories owned elsewhere unless they have permission, that represents the only limit. Writers will likely use this tool for a very wide variety of topics.

As shown in FIG. 5, the writer can insert images to be the cover art or icon that the user views when looking at a library of works from which to select. The user includes input regions where the writer user can include the title of the story, the description, tags that allow the user to search, a category, copyright information, and the price. In some embodiments, the writer user can designate the title as a mature story. Referring back to FIG. 2, if the reader user is not over 16 years old, the system will not display these options.

The stories developed on the IFFLY™ platforms by writers allow the writers to provide multiple versions and storyline options as the story progresses. The user, when reading, selects different storylines as provided by the writer. The user interface viewed by the reader has options at different points in the story, where buttons under each content block designate different options. The reader user selects the result, answer, or other event, that causes the storyline to follow that branch.

The system tracks the different storylines and the multitude of different branches of alternative storylines for both readers and writers. The writer creates a story and the system provides the tracking and branching capabilities. The terminology of the writer interaction has several defined terms. Through the system, the writer accesses a word processor-type interface with additional capabilities. The writer types in their text as "content blocks" and then creates branching storylines by inserting "buttons" into the content. Each button has its own content block and its own buttons. "Tracking lines" connect different elements and direct the game play. A "tracking line" will show the content that immediately follows a chosen button or content block. Tracking lines connect all the elements together. The reader users cannot see the tracking lines.

An example of one embodiment of tracking the story elements, meaning buttons and content blocks, uses a database to store all of the pieces. In one embodiment, the database comprises an open source NoSQL (Not only Structured Query Language) database management program, such as MongoDB. However, any tool that can manage document-oriented information, storage and retrieval may work. The following discussion is intended to provide an idea of how one would implement the tracking lines to connect the content blocks as the writer works. The writer sees the tracking lines, and number of tracking lines visible at any given time depends upon the zoom level of the writer's view.

```
_id: "SRpnNznjwaWmozRRA"
title: "Genesis"
contentBlock: "<p>Once upon a time..."
position: 0
status: "draft"
storyID: "RSMsLqfvdfrMbxhEx"
createdBy: "MxiLpez99mE8FCYoH"
> childrenLandingPoints: Array
createdDate: 2022-05-13T12:12:12.381+00:00
lastModifiedBy: "RSMsLqfvdfrMbxhEx"
lastModifiedDate: 2022-05-13T13:21:24.979.+00:00
trackingLines to: Array
  0: "5uEBuQDgyRDRwDcbi"
  1: "kn7ZPEndLCy5JXSz6"
  2: "7CJS9J7gfsM2jkrou"
```

The above code relates to a content block, as can be seen in the third line. A true content block would have all of the text of the content block. The top line gives the identifier for this content block. The text and number strings within the quotes are the identifiers for the various content blocks, writers, etc. In this embodiment, the database generates the codes. As can be seen, the writer has a code assigned to them as shown by the same code used for the createdBy and lastModifiedBy fields. The tracking lines go from this content block to other content blocks, each with the identifier of the other blocks. There are three possible paths from this content block, each of the three different content blocks identified by the tracking lines. This represents one embodiment of how to connect the content blocks together in the many alternative story lines of each title.

Figure 6:
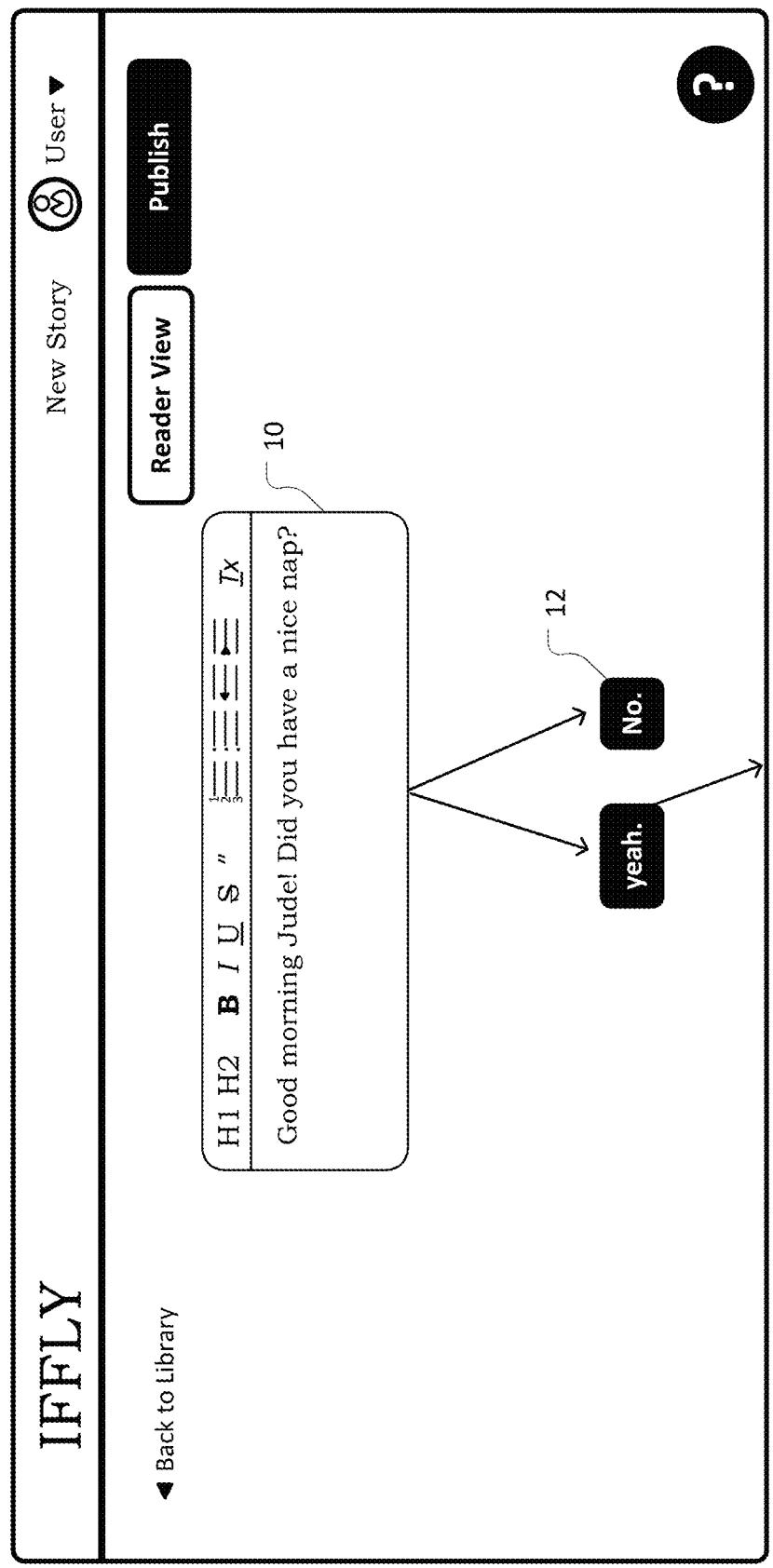
FIGS. 6-8 show embodiments of a user interface presented to a writer at varying levels of branching points.

FIG. 6 shows a writer user interface in which the writer user enters content in the content block 10. The buttons such as 12 represent an end of that content block and which the user must click to continue reading. In the example of FIG. 6, the buttons represent alternative answers the question in the content block. This creates a new screen seen by the reader user. The writer may provide one or more concurrent buttons to create multiple storyline choices for the reader. Some content blocks may only allow one button to direct the user to the next content block.

Many helpful keyboard commands allow the users to navigate the system. This includes a Help command, in one embodiment the Help command is CTRL/CMD+Shift. The user can zoom in and out, using CTRL+the up arrow to zoom out and +the down arrow to zoom in. Editing commands will feel very similar to those used in word processing software, such as Enter to form a new paragraph from a content block or button. Clicking on any story element, either a button or a content block, allows the writer user to edit the button or content block text, and CTRL+s saves the story.

Other commands allow the users to add new story elements, such as Shift+Enter to form a new button immediately below a content block when entered from a content block. If done at a button, it forms a second button below the button from which it was used. CTRL+Enter either from a content block or from a button forms a new content block immediately below. CTRL+Shift+Enter forms an additional, concurrent button when used from a button. From a content block, this forms a concurrent button and content block, alongside the button immediately preceding the content block. CTRL+Delete deletes the button or content block in focus. The writer user moves between the story elements by using Shift+Arrow. When a story element is selected or is focused upon, the writer can start typing.

The capabilities to create the content blocks will have many similarities to word processors. As set out above, specific, unique commands will exist to allow the writer to form buttons, and if one button already exists, it adds a second, concurrent button, etc. In addition, the writer can 'zoom in' or 'zoom out' to see the overall structure of their storylines. The user can manually add tracking lines to connect content blocks. The writer user can connect to a beginning story element and a destination story element. The user writer can also delete them.

Returning to FIG. 6, the writer user enters content into the content block 10. Once the writer user completes the block, the writer user can provide two or more alternatives in the forms of buttons such as 12, which will cause the appearance of branching point 14. In the examples here, the content block has one character ask another character a question and the buttons represent different answers to the question.

Figure 7:
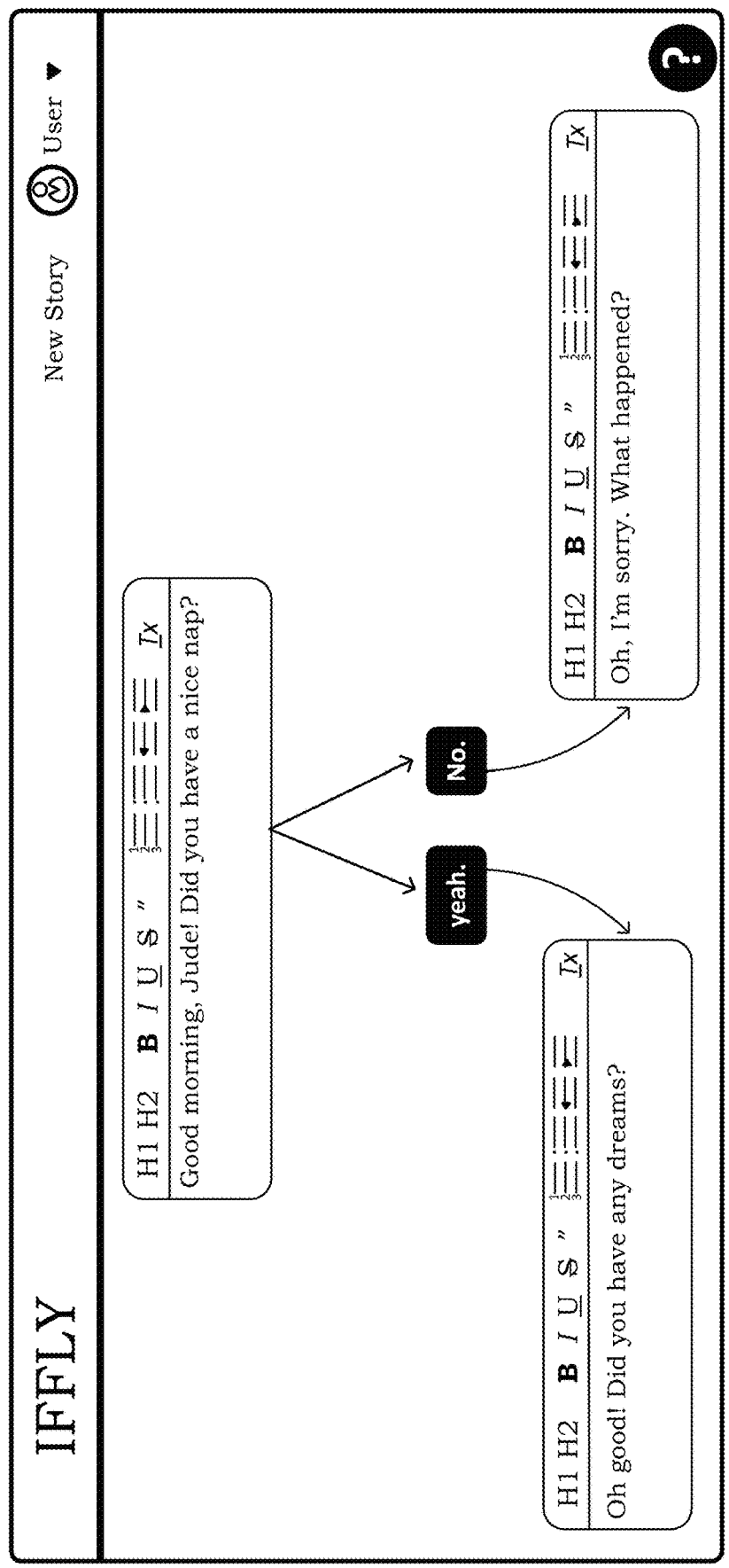

FIG. 7 shows an example of a writer's view with branching content with the initial content and the buttons. As discussed above, the writer can zoom out in stages or to zoom to a given story level. As shown here, each button results in another content block that continues the story based upon the branch selected. One should note, as has been mentioned, that the writing user may include multiple concurrent buttons, each representing an alternative storyline.

Figure 8:
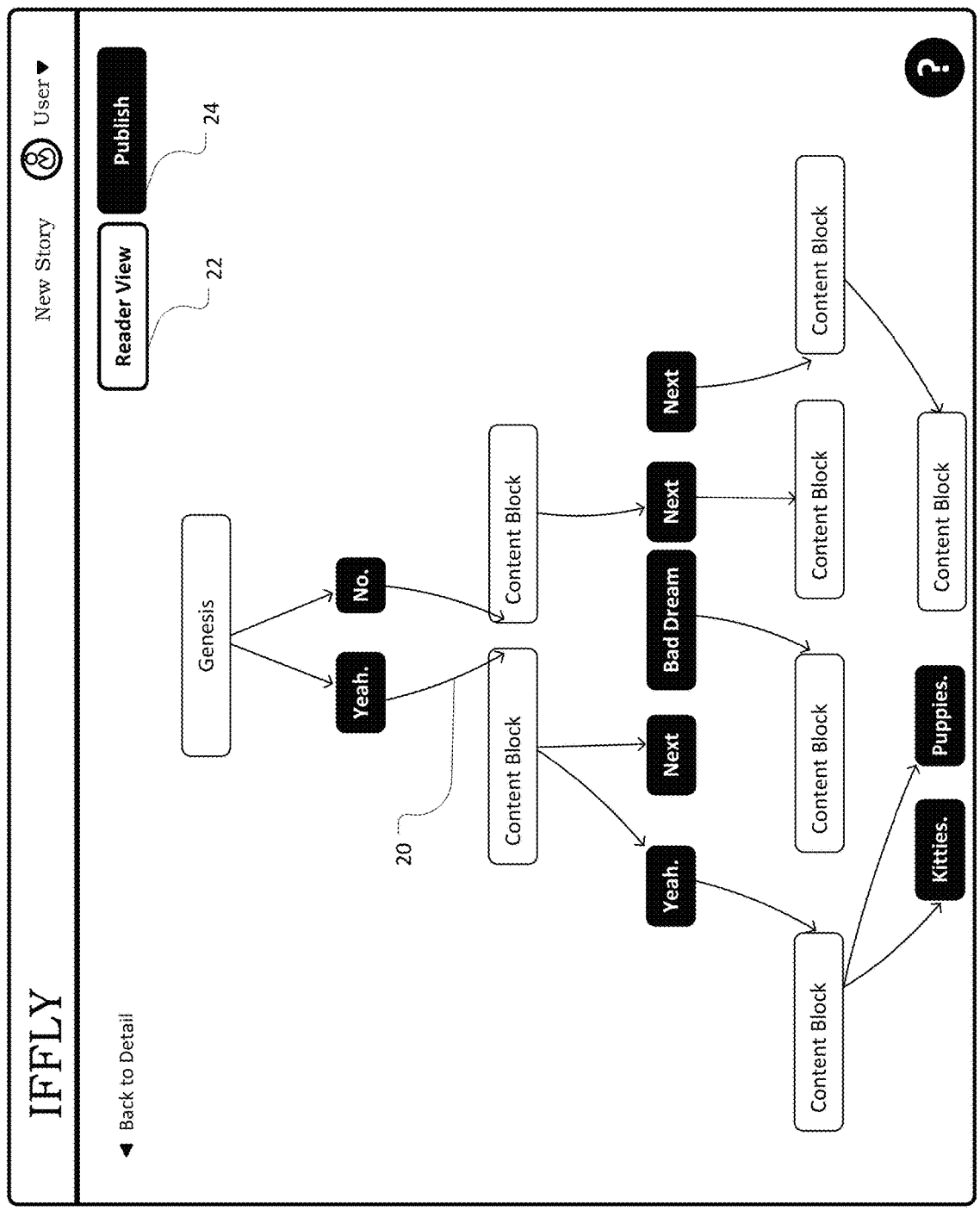

FIG. 8 shows an example of a "zoomed out" view that shows the branches at each level of the story. In the example, the first level has two concurrent buttons that then each have a content block associated with them. Each of those content blocks have two content blocks on the left story line, and three on the right storyline. Each button has an associated content block. One can see how quickly the alternative storylines can build and give reader users many different options that may prompt them to read/play one story several times.

FIG. 8 shows the content blocks and buttons. Tracking lines such as 20 may generate automatically. The writer can also manually connect the tracking lines to other content blocks that will cause the storyline to back up, jump, or present the user with other options. Tracking lines are automatically created when the writer user creates new story elements, a button or content block, but they can manually add or delete them to change the connections between story elements as well.

Figure 9:
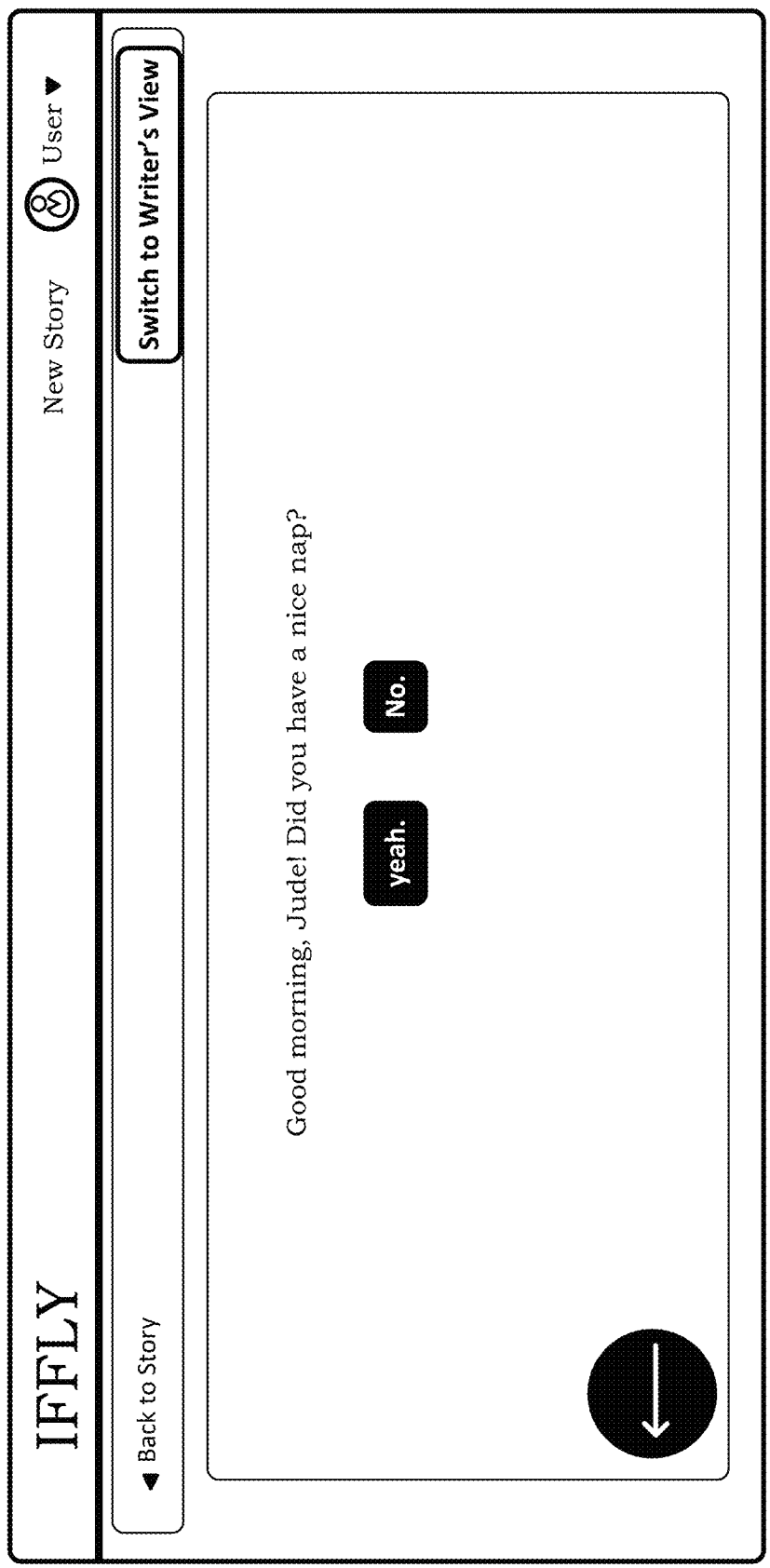
FIGS. 9-10 show an embodiment of a user interface presented to a reader showing branches in the written content.
Figure 10:
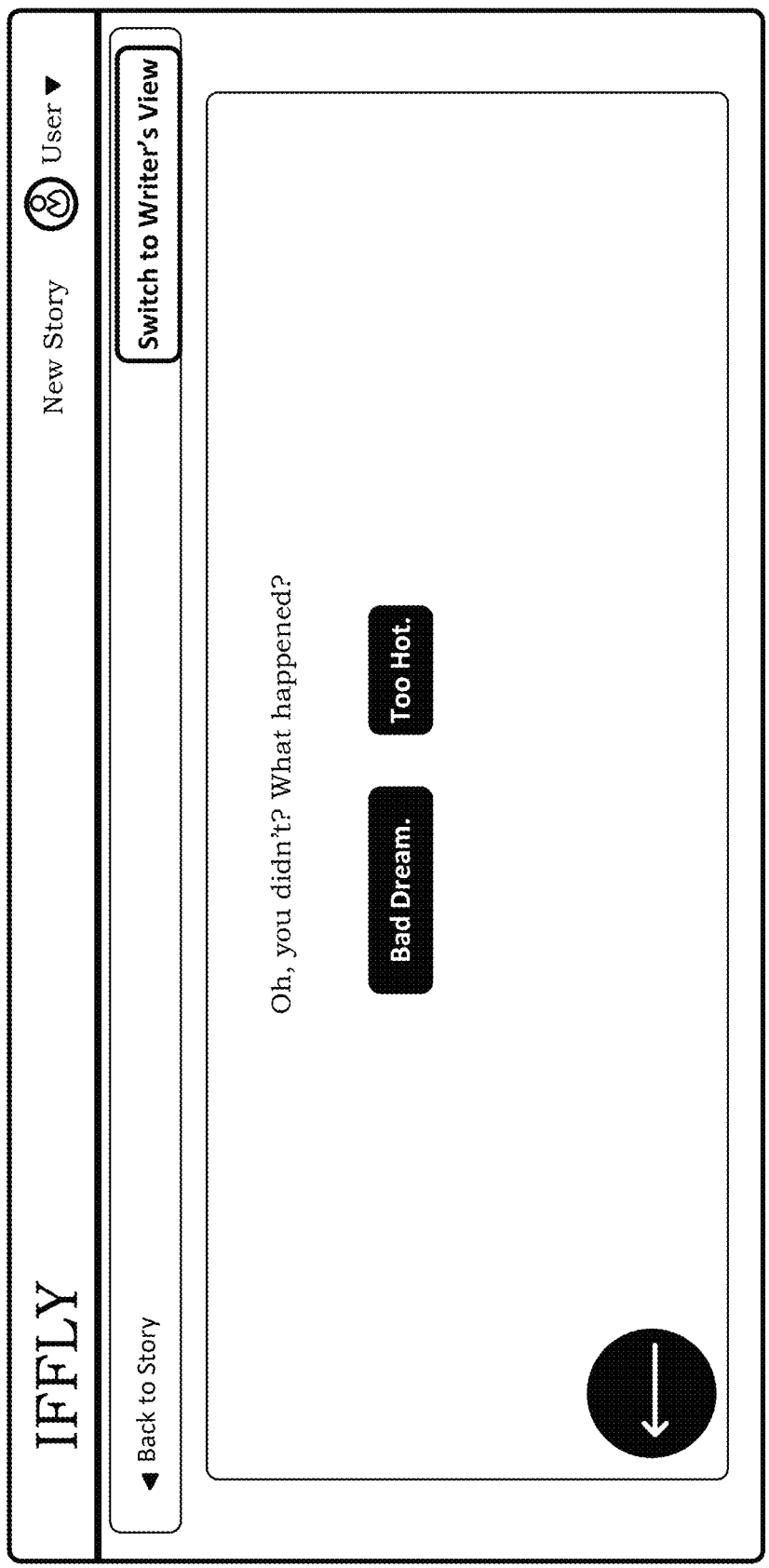

Also in FIG. 8, button 22 allows the writer user to see the view provided to the reader. FIG. 9 shows the reader user view for the first level of the story previously shown, and provides the user the ability to switch back to the writer view. FIG. 10 shows the user view if the user selected the NO button on the previous screen.

Button 24 allows the writer user to publish their story. This results in the various content blocks, buttons, and tracking lines to be encoded and stored. It also causes the story to be added to the library of available titles available to reader users.

In this manner, writers can access a system that allows them to build an interactive story with multiple levels of alternative storyline branches, where the system monitors, tracks and shows the writer all of the branches to keep the story consistent. Readers have access to new content, either in the form of new interactive stories that have no preexisting storyline, interacting stories based upon existing storylines, fan fiction, etc. The system provides a means to track and connect all of the various storylines as needed.

Figure 11:
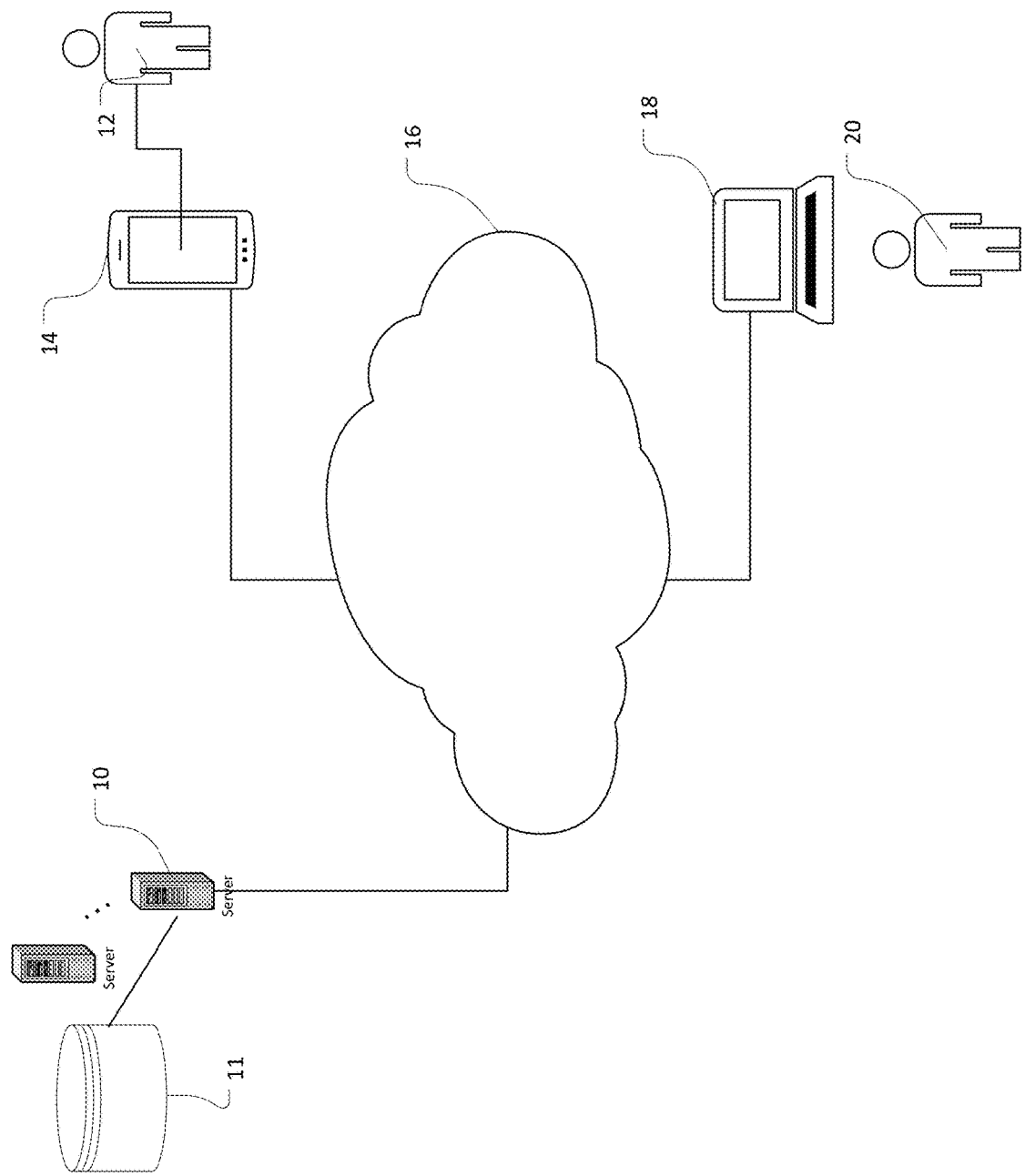
FIG. 11 shows a flowchart of an embodiment of a method of providing an online story.

As shown in FIG. 11, the users such as 18 and 20 access the platform comprising at least a server 10 through the internet 16. Each user will typically use a mobile computing device such as 14 and 18 to access the interactive fiction platform to either experience the content, or provide content. Reader users may also access the content from an application (app) on their mobile device to interact with the platform. Writer users will interact with the platform from a computing device through a browser. The browser may reside on a mobile device, but the app will more than likely not contain the writing functionality.

In either case, the one or more processors in the mobile devices interact with one or more processors in the server. The server may comprise one or more servers, may comprise a "cloud" server, and may include an internal or external database 11. When a user clicks a button, the content associated with that button is accessed and provided on a user interface as discussed above, including zoom in and out buttons available to the writers. The system may have one server or the capabilities may be distributed through several servers and databases. Similarly, when the user completes a session of their story, or a story, the one or more processors on the server will store the content, the associated branching points, etc.

The one or more processors on the server will execute code to perform the various tasks. These may include presenting the user interface to the users, whether they be writers or readers, and storing the content. For readers the one or more processors may just store the last place in the content the user was reading. For writers, the processors will insert the various branching points into the code of the story, with content associated with each branch of the branching point to populate as the user makes selections.

Figure 12:
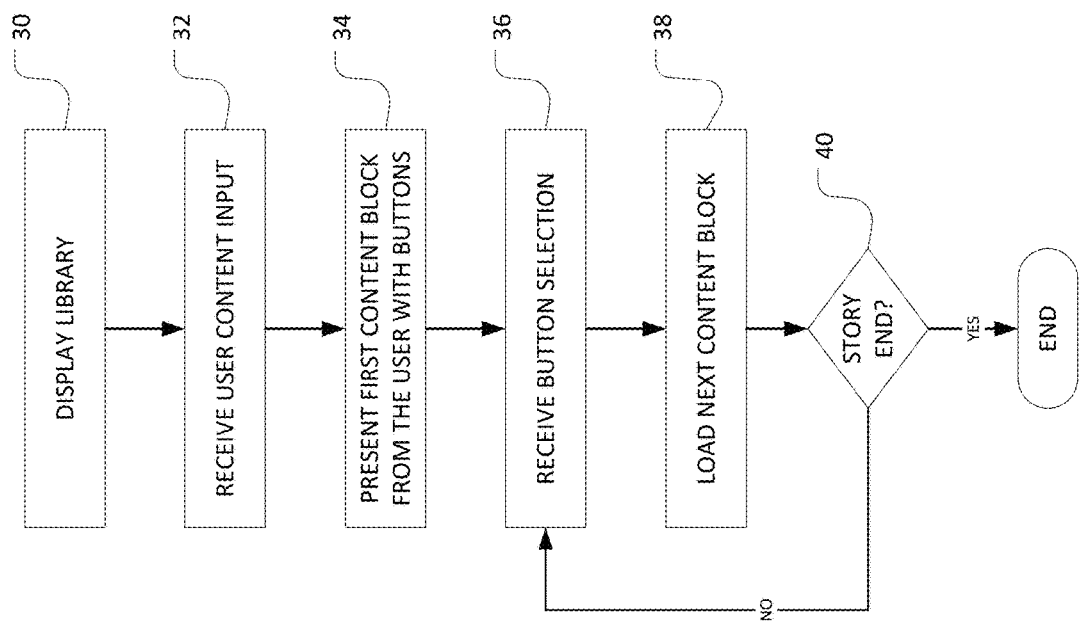
FIG. 12 shows a flowchart of an embodiment of a method of providing an online writing platform.

FIG. 12 shows a flowchart of one embodiment of a computer-implemented method of providing a reader user with interactive story content. At 30, after the reader user signs in, whether they have newly set up their account or a returning user, the platform presents the reader user with a library of available titles, where the term title refers to a story with alternative storylines all with the same story. The library may comprise the reader user's library, or a library of titles available for purchase. The reader user makes a selection and the platform receives this as the reader user content selection at 32. The system then accesses the title, comprising the content blocks, associated buttons and tracking lines associated with the buttons to link the story blocks together. The system then presents the first content block to the reader user at 34. After reading the content block, the reader user then selects one of the buttons that lead to the next content block for the storyline associated with that button at 36. The system then loads the next content block and repeats the loading of content blocks and receiving button selections until the story ends at 40.

One should note that this represents the basic process of providing content to the reader user. If allowed by the writer user when they wrote the story, the reader user may back up to previous content blocks and select different buttons and "move around" the story until they find a storyline they want to follow or just continue to explore. The flowchart of FIG. 12 provides one embodiment of the process and is not intended to limit the reader user's navigation of the storyline, nor should any such limitation be implied.

Figure 13:
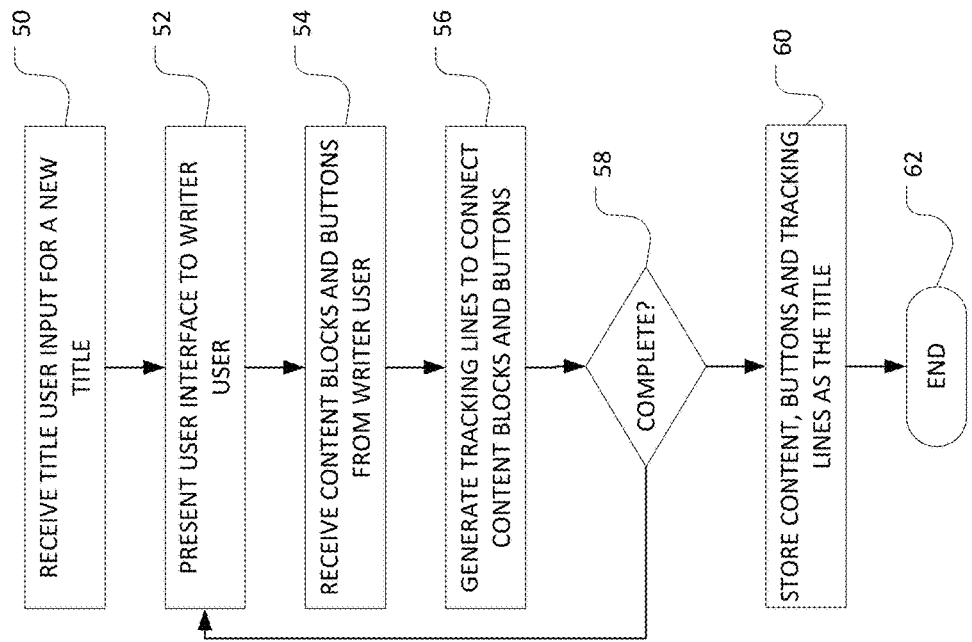
FIG. 13 shows an embodiment of a system for providing users with interactive fiction content.

Similarly, FIG. 13 shows one embodiment of a process of providing a writer user with the ability to create a title by writing content blocks and providing alternative paths for each content block. The process begins after the writer user has signed in, as discussed above. The platform then presents the writer user with the content block editing user interface at 52. As discussed above the writer user may add many buttons, but will generally have at least two buttons to provide the alternative storylines. The platform receives the content blocks and the buttons created or at least renamed by the writer user at 54. The platform automatically generates the tracking lines at 56, but the writer user can also add them manually as discussed above. This process repeats at 58 until the writer user indicates completion. Completion could mean that the writer user has finished a title, or may also indicate that the writer user is exiting the platform for now. The platform then stores the content, buttons, and tracking line information as the title at 60, complete or not, and the process ends. One should note that the platform might periodically store the information related to the title while the writer user works on it, but when the writer user completes the platform will perform a store operation.

In this manner, the embodiments provide an interactive platform for reader users to experience, and writer users to create, stories having multiple alternative storylines. The reader users may experience the same title multiple times, each experience different from the others. The writer users may create titles having multiple storylines, allowing the writers to write for multiple situations in a same story that would not otherwise be possible.

Aspects of the disclosure may operate on a particularly created hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

All features disclosed in the specification, including any claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the claims.

I claim:

1. A computer-implemented method of providing writer users with a platform to create interactive, alternative storylines, comprising:
    presenting a title user interface to a writer user;
    receiving one or more user inputs through the user interface, the one or more user inputs providing title information for a new title for which the writer user intends to create content blocks;
    presenting a writing user interface to the writer user, the writing user interface having a word processor-type interface;
    repeating, until the receiving one or more user inputs from the writer user indicates completion:
        receiving a text input forming a content block for the storylines from the writer user through the user interface, and text labels for one or more buttons associated with the content block where the buttons appear automatically from an entry by the writer user, the content block being part of one or more of the alternative storylines; and
        automatically generating, by the computer, tracking lines linking the content block to the buttons; and
    storing the content blocks, buttons and tracking lines in a database when the writer user indicates completion of the alternative storylines.

2. The computer-implemented method as claimed in claim 1, further comprising providing a button on the user interface that, when activated, causes the user interface to alter the user interface to a reader view.

3. The computer-implemented method as claimed in claim 1, further comprising providing a zoom command to allow the writer user to see multiple content blocks and branches that connect the content blocks together in one or more alternative storylines.

4. The computer-implemented method as claimed in claim 1, wherein the input from the writer user indicating completion comprises a publish input that causes publication of the content blocks as the title into a library.

5. The computer-implemented method as claimed in claim 4, wherein the publish input causes the title to be sent to a reviewer for approval.

6. The computer-implemented method as claimed in claim 1, further comprising presenting a user interface to the writer user to allow the writer user to sign in as an existing user or to set up an account.

7. The computer-implemented method as claimed in claim 1, further comprising presenting a user interface to the writer user allowing the writer user to provide payment information.

8. A platform to provide content to reader users and to gather content from writer users, comprising:
    a database configured to store content blocks, buttons and tracking lines associated with a title;
    one or more servers to render user interfaces to reader users and writer users; and
    one or more processors configured to execute code that causes the one or more processors to either:
        present a user interface displaying one or more titles accessible by a reader user;

receive a user content input through the user interface identifying selection of a title;

present a first content block from the title to the reader user with one or more buttons to indicate alternative storylines in the title; and repeating until a final content block is accessed:
- receiving a button selection from the reader user through the user interface; and
- loading a next content block indicated by the button selection;

or present a title user interface to a user;

receive one or more writer user inputs through the user interface, the one or more user inputs providing title information for a new title for which the writer user intends to create content blocks;

present a writing user interface to the writer user, the writing user interface having a word processor-type interface;

repeat, until the receiving an input from the writer user indicating completion:
- receive text inputs forming a content block for the storylines from the writer user through the user interface, and text labels for one or more buttons associated with the content block, where the buttons appear automatically from an entry by the writer user, the content block being part of one or more of the alternative storylines; and
- automatically generate, tracking lines linking the content block to the buttons; and associating the content blocks, buttons and tracking lines with the title and storing the content blocks, buttons and tracking lines in the database when the input from the writer user indicates completion.

\* \* \* \* \*